United States Patent [19]
Frannea

[11] 3,803,362
[45] Apr. 9, 1974

[54] METHOD AND APPARATUS FOR COLLECTING DIGITAL TRANSDUCER SIGNALS

[75] Inventor: Joseph M. Frannea, Oklahoma City, Okla.

[73] Assignee: Mobil Oil Corporation, New York, N.Y.

[22] Filed: Dec. 27, 1972

[21] Appl. No.: 318,804

[52] U.S. Cl................ 179/15 A, 178/50, 178/69 D, 179/15 BL
[51] Int. Cl.............................................. H04j 3/04
[58] Field of Search.......... 179/15 A, 15 BL, 15 AS; 340/206, 183; 178/23 A, 69 B, 69 G, 69 N, 50

[56] References Cited
UNITED STATES PATENTS

| | | | |
|---|---|---|---|
| 3,535,458 | 10/1970 | Gottfried | 179/15 A |
| 3,626,398 | 12/1971 | Owens | 340/183 |
| 3,649,766 | 3/1972 | La Marche | 179/15 AS |
| 3,427,475 | 2/1969 | Wilkinson | 179/15 BL |

Primary Examiner—William C. Cooper
Assistant Examiner—David L. Stewart
Attorney, Agent, or Firm—A. L. Gaboriault; William D. Jackson

[57] ABSTRACT

A system for the collection of data from a plurality of transducers having serial digital outputs in which the base signal levels and data transmission rates may vary. The system comprises a selector unit which applies the output signal from the appropriate transducer to a comparator unit and a reference unit. The reference unit automatically generates a reference signal which corresponds to the base level of the transducer signal. This signal is applied along with the transducer signal to a comparator unit which produces output signals corresponding to the logic of the transducer signal. The output of the comparator is then applied to decommutator.

8 Claims, 3 Drawing Figures

METHOD AND APPARATUS FOR COLLECTING DIGITAL TRANSDUCER SIGNALS

BACKGROUND OF THE INVENTION

This invention relates to the collection of data from a plurality of transducers having serial digital outputs and more particularly to the collection of such data from installations in which the output signal levels and transmission rates may vary from one transducer to another.

In supervisory control systems, it is necessary to collect data from a number of status or measuring stations and assemble the collected data at a central location. For example, in the supervisory control of oil field production operations, it has become a conventional practice to measure such production variables as fluid flow rate, temperature, pressure, and liquid levels. The measurements normally are taken at widely scattered locations and transmitted to a central master station. The master station may function simply to accumulate and display data for use in manual control operations or it may function to carry out control actions automatically under the direction of a programmable digital computer or a hardwired controller.

In a typical oil field supervisory control system, the outputs from a large number of transducers are applied to a remote terminal unit which functions to carry out multiplexing operations and, where the transducer signals are in an analog format, to carry out analog-to-digital conversions. The information from the various transducers is then transmitted in a digital format from the remote terminal unit to the master station.

SUMMARY OF THE INVENTION

In accordance with the present invention, there is provided a new and improved method and apparatus for collecting data from a plurality of remotely located transducers which transmit information in a serial digital format. The invention is designed for use with pulse code modulated signals which may exhibit varying base signal levels and varying transmission rates from one transducer to another. In carrying out the invention, data from the transducers is collected on a time multiplexing basis. When a given transducer is selected for transmission, a reference signal is established which corresponds to the base level of the signal from the selected transducer. This reference signal is then compared with the signal from the transducer in order to generate first and second logic output functions in response to the level states of the transducer signal relative to the reference function. Thus when the transducer signal exhibits a first level state relative to the reference function, the first logic output function is produced and when the transducer signal exhibits at least a second level state relative to the reference signal, a second logic output function is produced.

In a further aspect of the invention, there is provided a system for the collection of data from a plurality of transducers such as described above. The system comprises means for applying the digital signal from a selected transducer to an input terminal of the system. At the input terminal, the transducer signal is applied to a reference generator and also to a comparator. The reference generator responds to the transducer signal to establish a reference signal corresponding to the base level of the transducer signal. This reference signal also is applied to the comparator means. The comparator responds to the applied transducer and reference signals to produce logic output signals depending upon the level states of the digital signals from the transducer. The system further comprises a decommutator which responds to the logic output signals to produce a readout representative of the transmitted transducer signal.

DESCRIPTION OF SPECIFIC EMBODIMENTS

The present invention may be utilized to advantage in any system where it is desired to apply readouts from a plurality of remotely located digital transducers to a central recording and/or computation station. The transducers may be of a type which have an innately digital output or they may be of a type in which an analog signal is converted to a digital format before transmission. Digital telemetry is advantageous in that digital signals can be transmitted over relatively long distances without significant transmission errors. This is of particular advantage in oil field applications in which it is desired to transmit data from a subterranean depth, for example, 5,000 to 10,000 feet or more, to the surface and thence to the multiplexing system. Thus a preferred application of the present invention resides in the collection of data from bottomhole pressure measuring means or other transducers located at depths in wells.

The invention will be described with respect to a specific embodiment for the collection of data from digital transducers in which the signals are coded in a binary return-to-base format. However, it will be recognized that the invention may be employed in the collection of data exhibiting other coding formats such as return-to-zero or nonreturn-to-zero codes. Also while the transducer signals normally will be coded in a binary base, the invention may be employed for the collection of data coded in other numerical bases such as base three or base four.

Figure 1:
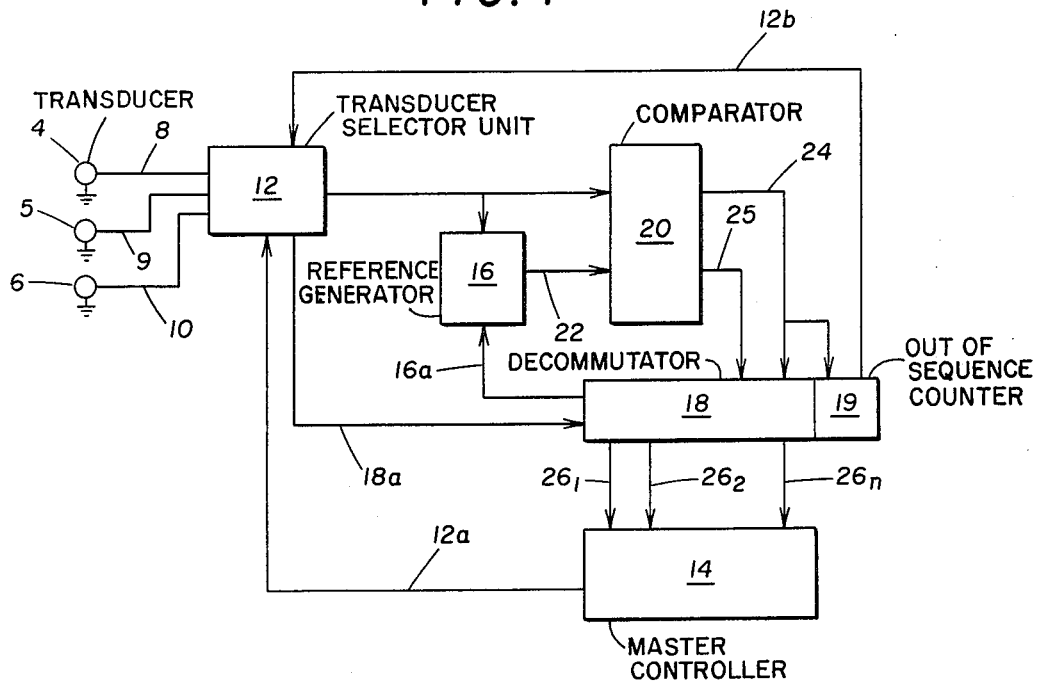
FIG. 1 is an illustration showing a block diagram of the several functional components of the invention.

Turning now to FIG. 1, there are shown a plurality of transducers 4, 5, and 6 which are connected through earth grounds and conductors 8, 9, and 10, respectively, to a transducer selector unit 12. The transducer selector unit is controlled by means of a master control unit 14 which may take the form of a properly programmed digital computer, a hardwired automatic control device, or a manual control device. Master unit 14 also acts to accept data from a decommutator unit 18.

When it is desired to receive data from a given transducer, the master controller inititates the data collection sequence by sending a command signal via channel 12a to unit 12 to select the desired transducer. Selector 12 in turn applies a signal via channel 18a to decommutator 18. The decommutator is reset in response to this signal and sends a signal via channel 16a to enable operation of a reference generator unit 16. The selected transducer applies its serial digital output signal through selector 12 to a comparator unit 20 and the reference generator unit 16. The reference generator responds to the transducer signal and automatically establishes a reference signal which corresponds to the base level of the transducer signal and which holds at the reference level throughout the data collection sequence. The reference signal is applied via channel 22 to the comparator unit 20. The comparator unit functions to compare the several level states corresponding to the coded logic states, e.g., zero and one, with the reference signal to produce the appropriate logic output signals. The logic output signals are applied via channels 24 and 25 to decommutator 18. This unit responds to the logic outputs of comparator 20 to produce a readout representative of the transducer signal and may be of any suitable type. For example, decommutator 18 may comprise a serial-to-parallel converter and the values of the several bits in the transducer signal then applied as a parallel digital signal to the master unit 14 by means of channels $26_1$, $26_2$, ..., $26_n$. The number of channels from decommutator 18 will of course correspond to the number of bits in each word frame plus whatever sync and status bits may be employed. For a description of decommutation techniques employing serial-to-parallel conversion, reference is made to Gruenberg, Elliot L., HANDBOOK OF TELEMETRY AND REMOTE CONTROL, McGraw-Hill Book Co., New York, Chapter 8, Section 12, entitled "PCM Decommutation, Processing, and Display," pp. 8-43 - 8-48.

Figure 2:
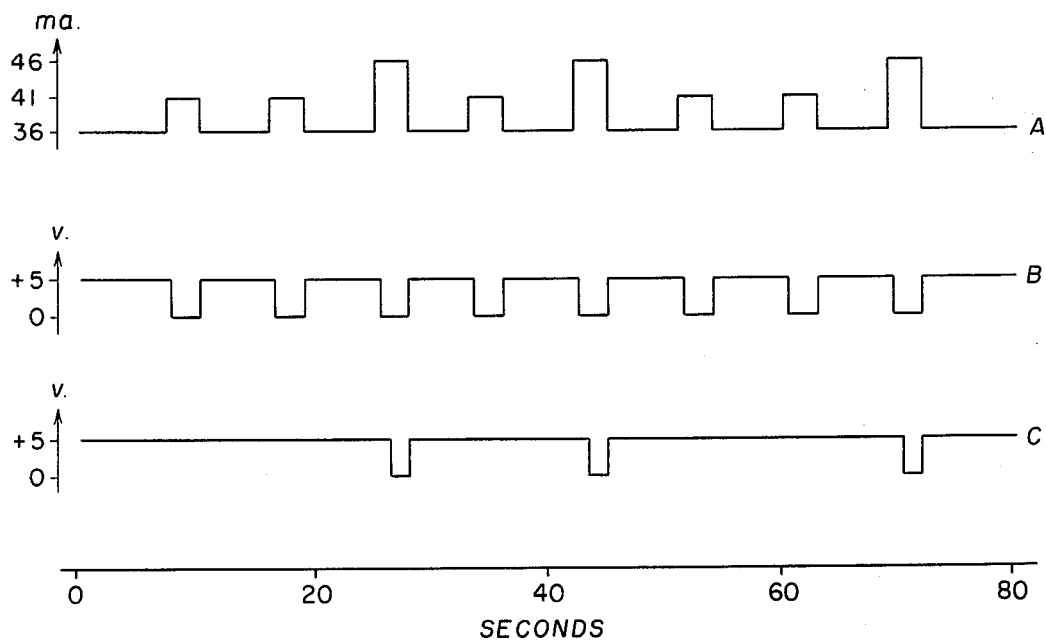
FIG. 2 is an illustration of waveforms showing a digital transducer signal and the logical outputs from the comparator unit.

In FIG. 2, waveforms A, B, and C illustrate respectively a serial digital signal which is coded in a binary return-to-base format and the corresponding logic output signals appearing on channels 24 and 25. Waveforms A, B, and C are plots of amplitude in ordinate versus time in abscissa with the values shown being typical for a given transducer. Considering first the transducer output, this signal is shown as consisting of an 8-bit word and as having a base level current of 36 milliamps. when a logical one is transmitted, the transducer current increases to about 41 milliamps and when a logical zero is transmitted, the transducer current increases to about 46 milliamps. After each bit interval, the transducer signal returns to its base level. Likewise, upon completion of transmission, the transducer signal returns to the base level. As shown by waveform B, comparator unit 20 produces on channel 24 an output pulse (after a short time delay) in response to each logical one and each logical zero from the transducer. The comparator unit produces an output pulse (after a somewhat longer time delay) on channel 25 for each logical zero.

The decommutator 18 is equipped with an out-of-sequence counter 19 to which the data bits on channel 24 are applied. Counter 19 is activated by the output on channel 24 and responds to a time delay between data bits indicative of the end of a word frame from the transducer to transmit an operations complete signal via channel 12b to selector unit 12. The selector unit responds to this signal to take power off of the transducer. Thus should the transducer begin transmitting in the middle of a word frame, counter 19 will apply a signal to unit 12 after the remainder of the frame has been transmitted. The transducer on its next interrogation then will be properly sequenced and will start to transmit at the beginning of a word frame. By way of example, where the several transducers 4, 5, and 6 transmit data bits at rates within the range of 4 to 8 seconds, counter 19 may generate an operations complete signal after a time delay of about 15 seconds.

Figure 3:
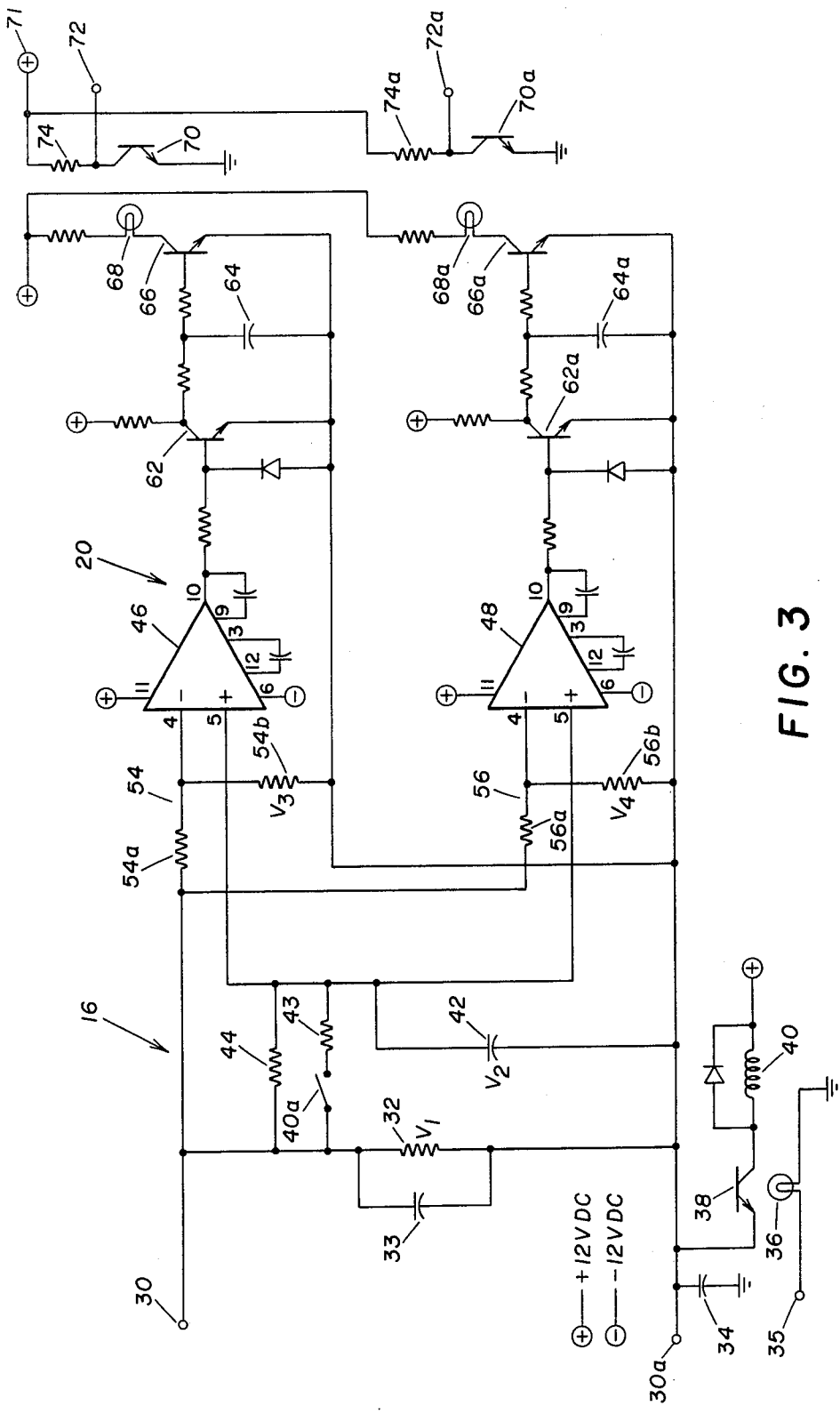
FIG. 3 is an electrical schematic of a preferred embodiment of the reference and comparator units of the present invention.

FIG. 3 illustrates specific circuitry employed in the reference generator unit 16 and the comparator unit 20. Turning first to the operation of the reference generator unit 16, upon command from the master controller to the transducer selector 12 (FIG. 1), a transducer supply voltage across a system input terminal 30 and a system common terminal 30a is applied through the selector unit to the appropriate transducer. Current then flows through a resistor 32, thus producing a voltage drop $V_1$ across the resistor. A parallel capacitor 33 acts with the resistor as a filter to cause the voltage $V_1$ to change slowly and to dampen out any fast variations. In addition, a capacitor 34 acts to pass any A.C. noise on the transducer conductor to an earth ground. At the same time, a reference signal is sent from decommutator unit 14 (FIG. 1) to apply power at terminal 35, thus causing a lamp 36 to be lit. This causes a phototransistor 38 to conduct through a relay 40.

When relay 40 is energized, it closes contact 40a thus allowing a reference capacitor 42 to charge through a low impedance circuit comprising resistor 43. Contact 40a remains closed throughout the reset and reference period to allow the capacitor 42 to become fully charged so that the voltage $V_2$ across capacitor 42 will be substantially the same as the voltage $V_1$ across resistor 32. This voltage corresponds to the base level of the transducer signal. Upon completion of the reset and reference period, lamp 36 goes off thus removing power from relay 40. Contact 40a is then opened and capacitor 42 remains charged through a high impedance circuit comprising resistor 44. The resistor 44 has a significantly higher resistance than resistor 43 such that the time constant of resistor 44 and capacitor 42 is substantially longer than the time constant of resistor 43 and capacitor 42. As an illustration of suitable circuit parameters for the reference unit: Capacitors 33 and 42 exhibit capacitances of 500 microfarads. Resistor 32 has a resistance of 20 ohms and resistors 43 and 44 exhibit resistances of 300 ohms and 150 kilohms, respectively.

The comparator unit 20 comprises first and second operational amplifiers 46 and 48 which function as level discriminators to compare the reference signal from capacitor 42 with the transducer signal. In the preferred embodiment shown, the operational amplifiers are set up to provide logic outputs to a decommutator employing TTL logic to recover the transmitted information. Thus operational amplifier 48 is employed to detect a level state of the transducer signal corresponding to a logical zero, and operational amplifier 46 is employed to detect level states of the transducer signal corresponding to either a logical zero or a logical one. This enables a determination to be made of when a data bit is being presented by the transducer. Thus sync may be established for each data bit and the system may be employed to collect data from transducers having varying data transmission rates. However, if this capability is not desired, the level discrimination operation may be totally disjunctive with one amplifier detecting only logical zeros and the other only logical ones.

The reference voltage $V_2$ on capacitor 42 is applied over the signal transmission interval to the positive input of operational amplifier 46. This same reference voltage also is applied to the positive input of amplifier 48. The transducer signal is applied through voltage dividers 54 and 56 (described hereinafter) to the negative inputs of amplifiers 46 and 48, respectively.

As noted previously, amplifier 46 produces a logic output signal in response to logical one and zero level states in the transducer signal, whereas amplifier 48 produces logic output only in response to logical zeros. While different relative discrimination levels between the two level discriminator circuits can be accomplished by any suitable technique, it is preferred to apply the transducer signal to the input of at least one level discriminator through a voltage divider network. Thus as shown in FIG. 3 the transducer signal is applied to the negative input of operational amplifier 48 through voltage divider 56 comprised of resistors 56a and 56b. By means of this voltage divider network, the voltage $V_4$ at the negative input of amplifier 48 is reduced sufficiently with respect to the transducer signal voltage $V_1$ across resistor 32 such that level discrimination takes place only for logical zeros. It is preferred also to apply the transducer signal to amplifier 46 through voltage divider network 54 comprised of resistors 54a and 54b. The voltage $V_3$ at the negative input of amplifer 46 is lower than voltage $V_1$ but sufficiently greater than the voltage $V_4$ such that level discrimination takes place for both logical ones and logical zeros. The voltage divider network 54 provides a sufficient bias below the base level voltage of the transducer signal to avoid a response to minor fluctuations (noise) in the base level voltage of the transducer signal. As an example of suitable circuit parameters, resistors 54a, 54b, 56a, and 56b may have resistances of 100 kilohms, 1 megohm, 100 kilohms, and 450 kilohms, respectively. With these circuit parameters, the voltage $V_3$ at the negative input of amplifier 46 will be equal to 0.91 $V_1$ and voltage $V_4$ at the negative input to amplifier 48 will be 0.82 $V_1$.

The operation of the comparator unit is as follows. When the transducer signal is at the base level current and after the reset and reference period, the voltages $V_1$ and $V_2$ will be equal. Thus the voltages at the negative inputs of amplifiers 46 and 48 will both be less than the reference voltages applied to the positive inputs of these amplifiers. At this state the outputs of operational amplifiers 46 and 48 are positive voltages which cause the respective transistors 62 and 62a to conduct. Capacitors 64 and 64a will remain discharged and transistors 66 and 66a are in a nonconducting state. Transistors 66 and 66a are connected in lamp circuits including lamps 68 and 68a, respectively, connected to a positive voltage source. So long as transistors 66 and 66a are not conducting, the lamps will be turned OFF.

When the transducer signal goes to a current level state corresponding to a logical one, the voltage $V_3$ at the negative input of operational amplifier 46 will increase to a value greater than the reference voltage $V_2$. The output of the operational amplifier then goes to a negative voltage which causes transistor 62 to stop conducting. Capacitor 64 will then start to charge causing the transistor 66 to be placed in a conducting state after a time delay for capacitor 64 to charge. Power is then applied to lamp 68 to turn it ON, thus energizing an associated phototransistor 70 so that it conducts current from a voltage source 71. With transistor 70 conducting, a voltage signal at terminal 72 will change to a value indicative of a logical one.

An increase in the transducer signal to a logical one level state will also be reflected in an increase of voltage $V_4$ at the negative input of operational amplifier 48. However, because of the voltage divider network 56, voltage $V_4$ will not increase to an amplitude greater than the reference voltage $V_2$. Thus the output of amplifier 48 will not be changed.

When the transducer signal goes to a level state corresponding to a logical zero (greater than the level state corresponding to a logical one as shown in FIG. 2) the output from operational amplifier 46 will change as in the manner described previously with respect to a logical one level state. In addition, the voltage $V_4$ at the negative input of operational amplifier 48 will increase to a value greater than the value of reference voltage $V_2$. The output of this amplifier will then go to a negative voltage, thus causing transistor 62a to stop conducting. Capacitor 64a will then charge causing transistor 66a to conduct and lamp 68a to be lit. This will cause the phototransistor 70a to conduct to produce a change in the voltage signal at terminal 72a corresponding to a logical zero. The signals appearing at terminals 72 and 72a are transmitted on channels 24 and 25 respectively to decommutator 18 (FIG. 1).

The circuit parameters of the output stages for amplifiers 46 and 48 are identical except for the capacitors 64 and 64a. Capacitor 64a will have a greater capacitance than capacitor 64 in order to provide a somewhat longer time delay before placing transistor 66a in a conducting state than the time delay for transistor 66 in a conducting state. For example, capacitor 64 may have a capacitance of 200 microfarads and capacitor 64a a capacitance of 450 microfarads. Thus as shown in FIG. 2, the output at terminal 72a is delayed somewhat with respect to the output from terminal 72. The time delays provided by capacitors 64 and 64a ensure that noise transients passed by the amplifiers will not affect the logic outputs at terminals 72 and 72a. The time delay for the output at terminal 72a relative to the output at terminal 72 enables the use of the latter to establish sync for each data bit presented at terminal 72a.

Output terminals 72 and 72a may be connected to a 5-volt D.C. source through 5-kilohm resistors 74 and 74a. Thus when information is not being transmitted, or when the selected transducer signal is at the base level, the signals at terminals 72 and 72a will remain at 5 volts. Of course, when transistor 70 or 70a starts to conduct, the voltage at the associated output terminal will be driven toward ground.

The invention may be employed for the collection of data from any suitable transducers having digital outputs in which base signal levels and/or the data transmission rates may vary. One such transducer is a bottomhole pressure transducer manufactured by the Ball Brothers Research Corp., Boulder, Colorado, and identified as the MK-9P Pressure Sentry. A 30-volt D.C. voltage source may be employed as supply voltage to power this transducer.

What is claimed is:

1. In a system for the collection of data from a plurality of remotely located transducers having pulse code modulated serial digital output signals of varying base levels, the combination comprising:

selector means for applying the signal of a selected transducer to an input terminal of said system, reference means responsive to the selected transducer signal for establishing a reference signal corresponding to the base level of said transducer signal, comparator means responsive to said transducer signal and said reference signal for generating a first logic output signal in response to said transducer signal exhibiting a first level state relative to said reference signal and generating a second logic output signal in response to said transducer signal exhibiting at least a second level state relative to said reference signal, and decommutator means responsive to said first and second logic output signals for producing a readout representative of said transducer signal.

2. The system of claim 1 wherein said reference means comprises:

a reference network including a reference capacitor connected to said system input terminal through a high impedance circuit and a normally open low impedance shunt circuit, means for closing said low impedance circuit for a reset and reference period concomitant with the initial application of said transducer signal to said input terminal and thereafter opening said low impedance circuit whereby said capacitor is initially charged to a reference voltage corresponding to the base level of said transducer signal and retains said reference voltage substantially constant throughout transmission of said transducer signal, and means for applying said reference voltage to said comparator means.

3. The system of claim 2 wherein said comparator means comprises first and second level discriminators, means for applying said reference voltage to each of said level discriminators, and a voltage divider input network for at least one of said level discriminators through which said transducer signal is applied.

4. The system of claim 1 wherein said comparator unit accepts digital signals coded in a binary return-to-base format and comprises:

first level discriminator means responsive to said transducer signal and said reference signal for producing a logic output pulse in response to only one of the bit levels of said transducer signal, and second level discriminator means responsive to said transducer signal and said reference signal for producing a logic output pulse in response to each of the bit levels of said transducer signal.

5. The system of claim 4 further comprising means for providing a time delay in the output of said first level discriminator relative to the output of said second level discriminator.

6. A method for the collection of data from any one of a plurality of remotely located transducers having serial digital signals which are pulse code modulated and of varying base levels, the steps comprising:

selecting one of said transducers and establishing a reference function corresponding to the base level of the signal from said selected transducer, and comparing said reference function and said transducer signal and generating a first logic output signal in response to said transducer signal exhibiting a first level state relative to said reference function and generating a second logic output signal in response to said transducer signal exhibiting at least a second level state relative to said reference function.

7. The method of claim 6 wherein said transducer signal is coded in a binary return-to-base format, said first logic output signal is comprised of time spaced pulses corresponding to one of the bit levels of said transducer signal, and said second logic output signal is comprised of time spaced pulses corresponding to both of the bit levels of said transducer signal.

8. The method of claim 7 further comprising the step of terminating the collection of data from said selected transducer after a predetermined time interval during which no pulse occurs in said second logic output signal.

* * * * *